United States Patent

[11] 3,539,234

| [72] | Inventor | George M. Rapata |
| | | Park Ridge, Illinois |
| [21] | Appl. No. | 576,485 |
| [22] | Filed | Aug. 31, 1966 |
| | | Continuation of Ser. No. 334,525, Dec. 30, 1963, abandoned |
| [45] | Patented | Nov. 10, 1970 |
| [73] | Assignee | Illinois Tool Works, Inc. Chicago, Illinois a corporation of Delaware |

[54] BUSHING
8 Claims, 24 Drawing Figs.

[52] U.S. Cl. .................................................. 308/238, 287/85
[51] Int. Cl. .................................................. F16c 33/04
[50] Field of Search .......................................... 308/72, 238; 287/90(A), 90(C), 85(A), 87, 88, 85; 16/2

[56] References Cited
UNITED STATES PATENTS

| 853,339 | 5/1907 | Boon | 287/87X |
| 1,483,903 | 2/1924 | Masury | 308/26UX |
| 1,674,623 | 6/1928 | Claus | 308/26 |
| 1,909,010 | 5/1933 | Riker | 287/85(A) |
| 2,061,985 | 11/1936 | Saurer | 287/90(C) |
| 2,578,809 | 12/1951 | Ketchum | 287/85(A) |
| 2,642,240 | 6/1953 | Peiril | 287/85 |
| 2,659,920 | 11/1953 | Bogan | 248/349X |
| 2,668,316 | 2/1954 | Sturtevant | 16/2 |
| 2,693,333 | 11/1954 | Race | 287/12X |
| 2,855,232 | 10/1958 | Kozak | 308/26UX |
| 2,862,741 | 12/1958 | Baker | 287/85(A) |
| 2,937,895 | 5/1960 | Langen | 287/87 |
| 2,996,308 | 8/1961 | Cislo | 287/85X |
| 2,999,708 | 9/1961 | Dudash | 287/87 |
| 3,025,090 | 3/1962 | Langen | 287/90(A) |
| 3,097,005 | 7/1963 | Fickler | 287/90(A) |

*Primary Examiner*—Fred C. Mattern, Jr.
*Assistant Examiner*—Wesley S. Ratliff, Jr.
*Attorney*—Robert W. Beart

ABSTRACT: One piece bushing of resilient and deformable plastic material for permitting rotational and angular movement of a shank element relative to a bore. The bushing includes a substantially spherical outer peripheral surface having deformable portions which are depressed into adjacent portions by compression forces applied to the bushing by the shaft and bore wall.

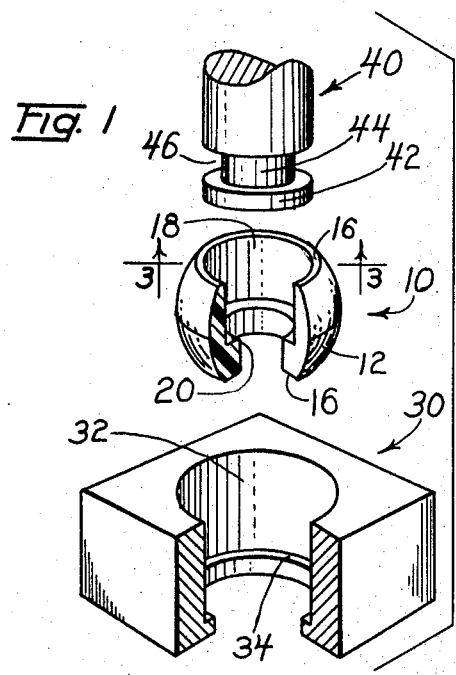
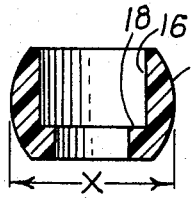
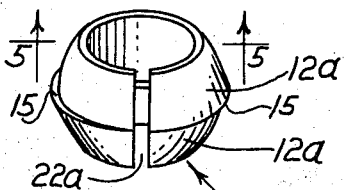
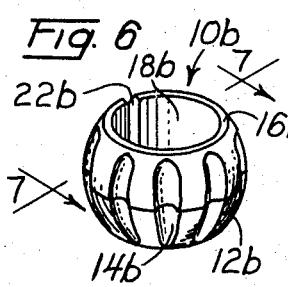
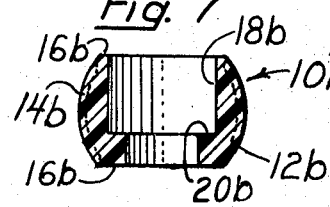
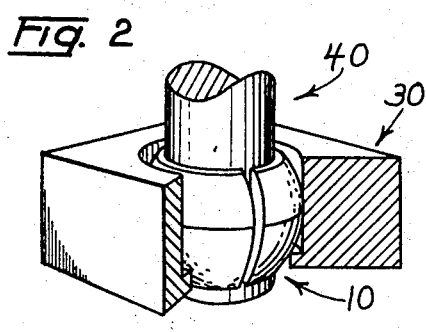
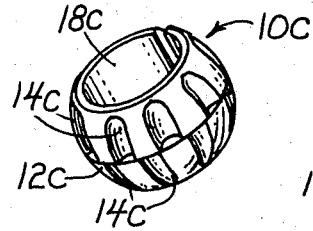
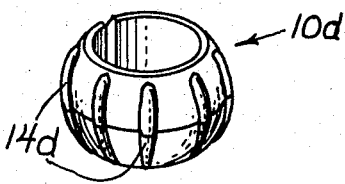
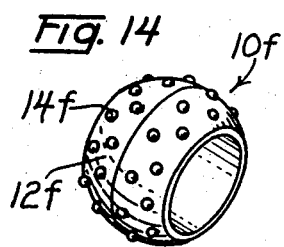
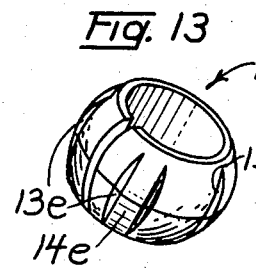
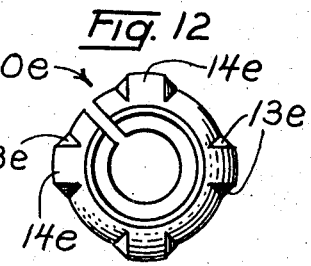
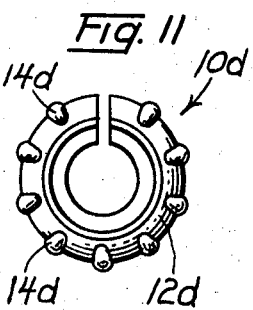
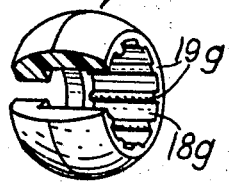
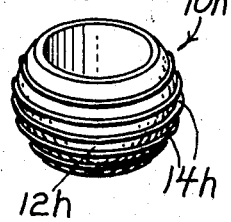
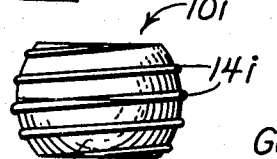
INVENTOR.
George M. Rapata
BY Robert W. Beart
His Att'y

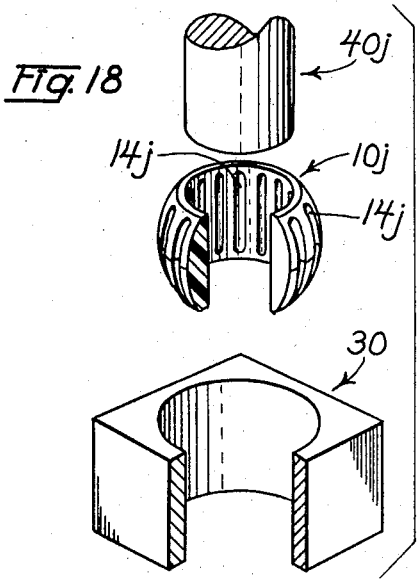
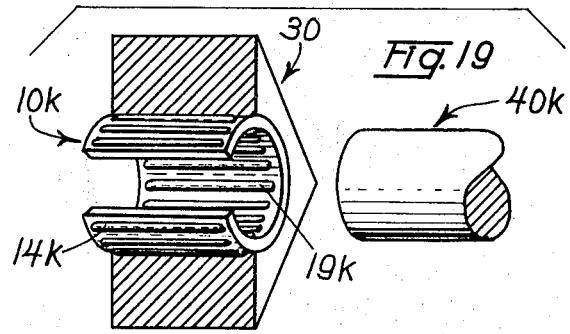
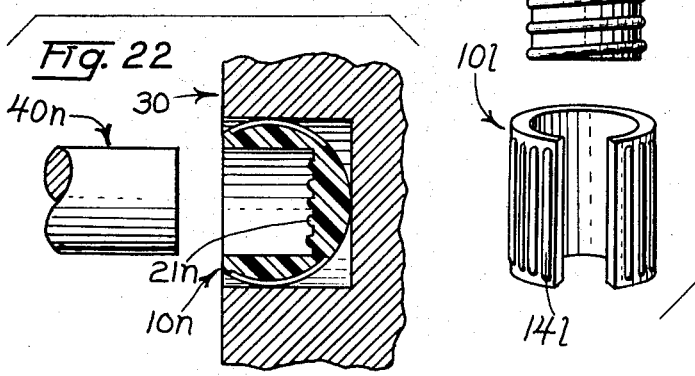
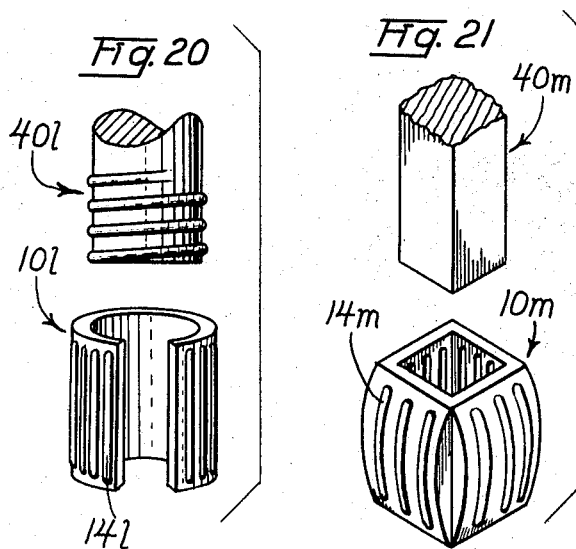
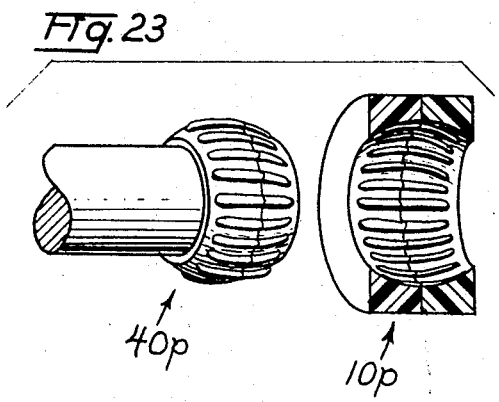
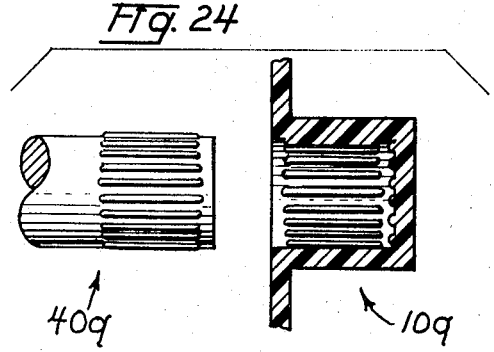
INVENTOR
George M. Rapata
BY Robert W. Beart
His Att'y 3,539,234

BUSHING

This application is a continuation of U.S. Pat. No. 334,525, filed Dec. 30, 1963, now abandoned.

This invention relates to a one-piece device adapted to retain a complementary member in a workpiece, and more particularly, to an improved bushing which retains a stud member or shaft element within an apertured workpiece while permitting relative movement thereof.

Bushings are used to reduce the effect of friction on moving parts, and in some instances, to decrease the diameter of a hole as well. There are many industrial and commercial applications requiring a bushing which not only reduces friction and takes up the dimensional slack between relatively movable interfitting parts, but which additionally provides a universal movement of one part relative to the other. As an example, the gear shift control lever for some transmissions requires an angular and rotational adjustment of the lever relative to its housing. Other obvious applications include adjustable mirrors, and simple linkages which transmit mechanical motion.

Adjustable type ball joints have heretofore been proposed to provide relative movement between interfitting parts. These devices normally have a wedge which forms part of the bushing, and which takes up the slack between the parts. Arrangements of this type, however, are relatively complex, require close tolerances and are very costly. In some instances, they are not adaptable to such parts due to the size and nature of the parts.

It is, therefore, an object of the present invention to provide complementary interfitting parts such as a bushing or stud member, one or both of which are provided with high unit pressure areas to reduce the effect of differences in the manufacturing tolerance thereof while permitting relative movement therebetween.

A further object of the present invention is to provide a novel bushing or stud member having deformable or other formations provided thereon to take up the dimensional slack between such parts when associated with one another, but permitting movement therebetween.

More specifically, it is an object of the present invention to provide a bushing which provides an interference fit between relatively movable interfitting workpieces by a deformation or engagement of portions of the bushing or stud member with a complementary part during axial assemblage of such parts.

Another object of the present invention is the provision of a novel bushing which axially restrains movement between complementary interfitting parts or workpieces while permitting angular and rotational movement thereof.

Still another object of the present invention is the provision of a novel bushing which takes up the dimensional slack between a stud member or shaft element and a workpiece to compensate for differences in tolerance thereof.

A still further object of the present invention is the provision of a novel bushing which provides both a tight and loose fit for relatively movable interfitting parts or workpieces.

Yet another object of the present invention is the provision of a novel bushing made of a plastic material which reduces the effect of friction, and provides lubricity between relatively movable interfitting workpieces.

Still another object of the present invention is the provision of a one-piece plastic bushing of novel configuration which has a relatively simple construction, and which can be easily and economically manufactured by present molding techniques to result in a beneficial reduction in the cost of manufacture of the bushing.

A still further object of the present invention is the provision of a novel bushing which can be quickly and easily assembled to relatively movable interfitting workpieces, and which thereafter securely retains the workpieces together while permitting angular and rotational movement thereof.

Other and further objects and advantages of the present invention will become apparent from the following description when taken in conjunction with the accompanying drawings, wherein:

FIG. 1 is an exploded fragmentary perspective view, partially in section, showing a spherical form of the novel bushing of the present invention as associated with a stud member and workpiece;

FIG. 2 is a fragmentary perspective view, partially in section, of the bushing of FIG. 1 as assembled with the stud member and workpiece;

FIG. 3 is a sectional view of the FIGS. 1—2 bushing as taken along line 3–3 of FIG. 1;

FIG. 4 is a perspective view showing another novel spherical bushing contemplated by the present invention;

FIG. 5 is a sectional view of the bushing shown in FIG. 4, and taken along line 5-5 thereof;

FIG. 6 is a perspective view of another novel spherical bushing embodied by the present invention;

FIG. 7 is a sectional view of the bushing shown in FIG. 6, and taken along line 7–7 thereof;

FIG. 8 is a top plan view of the bushing shown in FIGS. 6-—7;

FIG. 9 is a perspective view showing still another novel spherical bushing proposed by the present invention;

FIG. 10 is a perspective view of yet another novel spherical bushing incorporated by the present invention;

FIG. 11 is a top plan view of the bushing shown in FIG. 10;

FIG. 12 is a top plan view of another novel spherical bushing contemplated by the present invention;

FIG. 13 is a perspective view of the bushing shown in FIG. 12;

FIG. 14 is a perspective view showing still another novel spherical bushing proposed by the present invention;

FIG. 15 is a fragmentary perspective view of yet still another novel spherical bushing embodying features of the present invention;

FIG. 16 is a perspective view showing yet still another novel spherical bushing contemplated by the present invention;

FIG. 17 is a side elevational view of a further form of novel spherical bushing proposed by the present invention.

FIG. 18 is an exploded fragmentary perspective view, partially in section, of a novel bushing as associated with a stud member and workpiece, and combining the features shown in FIGS. 10 and 15;

FIG. 19 is an exploded fragmentary perspective view, partially in section, similar to FIG. 18, but showing a novel bushing of hollow cylindrical form;

FIG. 20 is an exploded fragmentary perspective view of a novel hollow cylindrical bushing prior to assembly with a novel stud member or shaft element;

FIG. 21 is an exploded fragmentary perspective view of another novel bushing contemplated by the present invention prior to assembly with a noncircular stud member or shaft element;

FIG. 22 is an exploded fragmentary perspective view partially in section, of another novel spherical bushing as it is held by an apertured workpiece prior to the insertion of the stud member or shaft element;

FIG. 23 is an exploded fragmentary perspective view, partially in section, of a novel bushing having a spherical aperture for use with a novel spherical stud member; and FIG. 24 is an exploded fragmentary perspective view, partially in section, of another novel bushing for association with still another novel stud member or shaft element.

The present invention contemplates many novel forms and embodiments of a bushing and its associated stud member or shaft element which accomplishes the aforementioned as well as other objects and advantages in a novel and unique manner. Spherical and cylindrical forms of both the bushing and stud member have been generally shown in the drawings, but it is to be understood that other curvilinear bodies as well as curvilinear and planar bodies may be used to achieve a desired movement of the parts.

The various forms shown in the drawings have also illustrated the bushing as being either a peripherally continuous hollow body or a hollow body with a longitudinal slit therethrough. In the discussion that follows, it will be understood that the bushing may either be solid or split and the figures of the drawings showing either one of these forms are to be considered in the sense of contemplating the other also.

The spherical forms of the bushing will first be described, and will be followed by a discussion of other bushing shapes, and various types of stud members.

Referring now to the drawings wherein like numerals designate the same parts throughout the various FIGS., there is shown various spherical forms of the novel bushing 10 in FIGS. 1—17, 18 and 22. One environment in which the bushing 10 may be used is illustrated, for example, in FIGS. 1—2. The bushing 10 is adapted to be received within the bore or aperture 32 of the workpiece 30, and in turn will accept the angularly and rotationally adjustable stud member 40. Bushing 10 is a one-piece plastic element which is preferably made from a resilient and elastic, yet deformable material. It is also desirable that the plastic material have the characteristic of lubricity to reduce the effect of friction. Numerous plastic materials having these characteristics are commercially available.

Bushing 10 is shown in FIGS. 1—2 as comprising a hollow body of substantially spherical exterior configuration, and having a longitudinal split extending throughout the entire axial extent of the body. The spherical outer surface 12 of the bushing is positioned intermediate a pair of substantially parallel flattened end portions 16, the lower one of which having a slightly larger dimensional extent for purposes to be presently described. A substantially cylindrical bore passageway 18 traverses the entire axial extent of the bushing except at the lower end thereof where a shoulder 20 is provided. The shoulder 20 projects radially inwardly from the wall of the cylindrical bore 18, and is adapted to be received within a groove 46 of the rotatable and angularly movable stud member 40.

The diameter of stud member 40 may be equal to or preferably slightly less than the diameter of bore 18. The stud member is substantially cylindrical in cross section, and is provided adjacent its free end 42 with an annular recess 44 to provide groove 46, the latter being complementary in section to the shoulder 20 of the bushing. The end of the stud member may be curved or slightly tapered to facilitate its introduction into the bushing.

The installation of the bushing is carried out by first introducing the bushing into an aperture 32 of the workpiece 30 until it abuts and rests against shoulder portion 34. The aperture 32 is provided with a dimension slightly less than that of the greatest peripheral dimension of the spherical outer surface 12 of the bushing. As a result, the bushing 10 when inserted into the aperture 32 is slightly peripherally contracted by the wall of the workpiece aperture. Thereafter, the stud member 40 is inserted within the bushing, while the bushing is mounted in the workpiece, so as to expand the body portion thereof and force the spherical outer surface 12 into contact with the wall of the workpiece aperture, and provide a pressure contact therebetween. The stud member 40 is adapted to be inserted into the bushing until the shoulder 20 is received within the groove 46 of the stud member, at which point the stud member is axially restrained from movement away from either the bushing 10 or the workpiece 30. The bushing 10 not only prevents the axial separation of the parts, but also accommodates the stud member in its angular and rotational movements. This is due to the spherical outer shape of the bushing as it cooperates with the cylindrical wall of the workpiece aperture 32.

Instead of contracting the bushing within the workpiece aperture, and then expanding the bushing by means of the stud member 42, it may be possible to make the workpiece aperture 32 slightly larger than the outer peripheral dimension of the bushing, and provide the stud member 40 with a circumferential dimension slightly greater than that of the cylindrical bore 18 of the bushing. The bushing 18 will then be slidably received within the workpiece 30, and thereafter expanded against the wall of the workpiece aperture upon the insertion of the slightly larger stud member 40.

In FIGS. 4—5 there is shown a bushing 10a which is formed as a result of mismatched cavity halves in a molding machine. In this form, the bushing is provided with a pair of annular rings 12a each having an outwardly flaring surface which diverges from one end to the other. The rings 12a are integrally joined to one another in overlapping axially offset relationship at the end portions of greatest diameter to form a substantially spherical outer configuration for the bushing. This form of bushing provides either a tight or loose fit when mounted within the aperture 32 of the workpiece. Dimension Z designates the smallest diameter of the bushing since it does not incorporate the overhanging ledge portions 15. This diameter Z is smaller than the diameter X of FIG. 3 where the bushing is formed by matched die mold cavities. On the other hand, the dimension Y, which incorporates the overhanging ledge portions 15, is larger than both the dimensions X and Z. Thus, when this bushing is mounted within the workpiece aperture 32, it will readily accommodate itself to the size of the stud member and workpiece facilitating relative angular and rotational movement of the components due to the differences in the exterior peripheral dimension of the bushing denoted by the letters Y and Z.

This invention also contemplates other novel ways of insuring that the parts are held in interfitting relationship, while permitting angular and rotational relative movement thereof. This is generally accomplished by providing formations such as grooves, splines, ribs or the like on the shperical outer surface of the bushing so as to provide a plurality of pressure contact points with the wall of the workpiece aperture 32, and provide a high unit pressure contact area which exceeds that of the plastic material. This enables the bushing to readily adapt itself to parts having slightly varying tolerances or varying size relationships.

Note, for example, the bushing shown in FIGS. 6—8, and designated by the numeral 10b. As in the other embodiments, this bushing is provided with an outer spherical surface 12b, end portions 16b, and a substantially cylindrical bore 18b. This embodiment also shows a bushing having a longitudinal split 22b therethrough. To provide an increased unit pressure with the wall of the workpiece aperture, the outer spherical surface 12b is provided with a plurality of grooves 14b which extend substantially in an axial direction throughout practically the entire extent of the body portion. As best seen in FIGS. 6—7, these grooves have substantially the same configuration and depth. The portions of the spherical outer surface 12b intermediate adjacent grooves are designed to contact the wall of the workpiece aperture and provide an increased unit pressure contact therewith throughout substantially the entire peripheral extent of the bushing.

The grooves may be spaced in alternating fashion on the upper and lower portions of the spherical outer surface 12c in the bushing 10c illustrated in FIG. 9. It will be noted that the grooves 14c extend only for approximately one-half of the axial length of the body, and are arranged so that the grooves alternate between the upper and lower portions of the spherical outer surface 12c. This form of the invention will function in substantially the same manner as the form shown in FIGS. 6—8. Another modified form of the invention is illustrated in FIGS. 10—11 as comprising a one-piece bushing 10d of the longitudinally split variety, and having a plurality of peripherally spaced curved rib members 14d formed on the spherical outer surface 12d of the bushing. This particular form of the invention functions in a somewhat different manner than those previously described since the ribs 14d are adapted to be deformed when the spherical outer surface 12d is forced into contact with the wall of the workpiece aperture 32. The effect of this is still to provide a plurality of pressure contact points resulting in a higher unit pressure contact area with the wall of the workpiece aperture than a bushing having no formations formed thereon. If desired, the ribs 14d may be arranged in an alternating sequence substantially like that shown by the grooves of FIG. 9 or other similar configuration.

FIGS. 12—13 show yet another type of formation which may be provided on the spherical outer surface of the bushing. It will be observed from an inspection of these figures that the bushing, designated by the numeral 10e, is provided with a plurality of peripherally spaced, axially extending curvilinear projections 14e which radiate outwardly from the outer spherical surface 12e of the bushing. Each of the projections 14e are intermediate a pair of tapered side walls 13e also formed on the spherical outer surface, the side walls extending between the projections and the spherical outer surface portion of the bushing. Projections 14e are also adapted to be deformed like the curved rib members of the FIGS. 10—11 embodiment when forced into contact with the workpiece aperture, and provide a high unit pressure contact therewith.

Other types of projecting formations which are adapted to be deformed are illustrated in FIGS. 14 and 16—17. FIG. 14 shows a plurality of peripherally spaced crushable nodule like members 14f on the spherical outer surface 12f of the bushing 10f, while the bushings 10h and 10i of FIGS. 16—17 respectively, are provided with a plurality of circumferentially extending projections 14h, 14i which extend from the spherical outer surface 12h, 12i of the bushings. It will be noted that the projections 14h in FIG. 16 extend substantially normal to the axis of the bushing whereas the projections 14i are helically or spirally arranged on the spherical outer surface of the body portion. In each of these cases, the projecting formations will be cold worked or deformed when forced into contact with the wall of the workpiece aperture in a similar manner as discussed above with respect to the FIGS. 10—13 embodiments.

The grooves or depressions shown in FIGS. 6—9 may be arranged on the spherical outer surface of the bushing in a similar manner to the projecting formations illustrated in the FIGS. 10—14 and 16—17 embodiments, if desired.

A still further form of the invention is shown in FIG. 15 by the bushing 10g. In this instance, crushable ridges 19g have been formed on the cylindrical bore 18g of the bushing to insure a suitable fit with the stud member 42. The ridges 19g when deformed will also provide a series of pressure contact points against the stud member to allow the bushing to conform to the application in which it is used. Other types of ridge designs may be used such as those previously shown, or grooves of similar configuration may be formed in the cylindrical bore to provide the desired pressure contact with the stud member.

If desired, it may also be possible to provide a bushing having combined internal and external formations. Take, for example, FIG. 18 which illustrates a bushing having the combined features of FIGS. 10 and 15. This would mean that a plurality of peripheral spaced curved rib members 14j are formed on the spherical outer surface of the bushing while crushable ridges 19j are formed on the cylindrical bore thereof. It will be noted that the crushable ribs 19j extend throughout the entire length of the bushing cylindrical bore for accommodating an uninterrupted cylindrical stud member 40j. This points up the fact that the angularly and rotationally adjustable stud member 40 of the previous embodiments need not be used with the bushing of the present invention. Other combinations of internal and external formations may be provided as will readily be apparent.

One final form of spherical bushing which is shown in the drawings is designated 10n in FIG. 22 of the drawings. The bushing is substantially similar to those previously discussed except that crushable formations 21n are provided on an internal flat surface portion of the bushing to take up the end thrust of the associated stud member 40n. In such a case, it would be desirable to provide a pair of these bushings on opposite sides of a shaft element or stud member for accommodating the differences in the manufacturing tolerance of the parts.

Now referring to the cylindrical shapes of the bushing previously eluded to, it will be observed that FIGS. 19—20 show two forms of such a bushing. In FIG. 19, the hollow cylindrical bushing 10k is provided with a plurality of crushable rib members 14k on the outer peripheral surface thereof, and a plurality of crushable ridge members 19k formed on the internal wall surface of the bushing. Such a bushing will accommodate a stud member 40k having an uninterrupted cylindrical outer surface. The bushing 10L shown in FIG. 20 differs from the FIG. 19 form in that the crushable ridge members on the internal wall surface of the bushing have been eliminated. Instead, the associated stud member 40L is provided with a helically arranged formation so as to provide the desired unit pressure contact between the stud member and bushing. A bushing having a cylindrical shape which is used in the environment illustrated in FIG. 18 will obviously permit only a relative rotatable movement of the stud member when it is associated with the bushing and workpiece.

If the particular situation requires only an angular adjustment of the stud member relative to the bushing and workpiece, it is possible to provide a noncircular bore for the bushing as illustrated in FIG. 21 of the drawings for use with a noncircular stud member 40m. While the bushing in such a case could obviously have a spherical or other curvilinear outer surface, the drawings show a bushing 10m having a plurality of spherical segments which will permit angular adjustment of the stud member when associated therewith.

Two other forms of novel bushings and stud members are shown in FIGS. 23—24 of the drawings. It will be noted in each instance that formations are provided on both the stud member and the bore of the bushing to take up the dimensional slack between the parts. The bushing 10p of FIG. 23 has a spherical socket for accommodating the ball stud or shaft 40p. Such a construction will readily facilitate angular and rotational movement of the stud member relative to the bushing. The bushing or bearing socket 10q illustrated in FIG. 24, which can be used with the FIG. 23 form, may be fixedly mounted in the frame of a machine or the like for accepting the rotatable stud member 40q. Thus, the bushing need not be mounted in a workpiece bore, but can be associated in a substantially rigid position with relation to various machine parts or the like.

From the foregoing, it will be appreciated that the present invention contemplates many novel bushing and stud member forms which restrict or hinder the axial separation of the parts, while permitting angular and/or rotational movement therebetween. Thus, the bushing and/or stud member will readily adapt itself to the parts and take up the dimensional slack thereof by the provision of high unit pressure area formations, and will also reduce the friction between the parts since one or both parts may be made of plastic which enhances the relative movement thereof. Simple design and construction of the bushing also provides ease of assembly and a reduced cost of manufacture, thus making this bushing a compact, functional and readily marketable product.

Although specific embodiments of the invention have been shown and described, it is with full awareness that many modifications thereof are possible. The invention, therefore, is not to be restricted except insofar as necessitated by the prior art and the spirit of the appended claims.

I claim:

1. A one-piece bushing made of resilient and deformable plastic material and adapted to be positioned within a complementary workpiece of predetermined constant cross-sectional size and configuration, said one-piece bushing being adapted to receive a shank element of smaller predetermined cross-sectional size and configuration than the bore in the complementary workpiece for movably and controllably mounting the shank element within and relative to the workpiece bore so as to permit rotational and angular movement of the bushing and a shank element therein relative to the workpiece bore:

a substantially spherical outer peripheral surface on said bushing being truncated on at least one end portion thereof;

said bushing having a passageway therein opening outwardly at least at the truncated end of the bushing outer surface, said passageway being adapted to cooperate with a shaft member placed therein for permitting the bushing and shaft to be moved together;

said passageway being defined by longitudinally extending wall surfaces each of different but substantially constant diameter cross section;

said different diameter wall surfaces cooperating to provide retaining means which are adapted to cooperate with a shaft placed therein for retaining the shaft against movement relative to said bushing;

said substantially spherical outer peripheral surface comprising first peripherally spaced portions deformable relative to the remainder of the surface by the application of pressure thereto when a bushing is inserted in a workpiece bore; and at least one material accommodating relief portion adjacent to at least one of said first peripherally spaced portions for accommodating material deformed from said portions.

2. The bushing as defined in claim 1 wherein said retaining portions in said passageway comprise rib means formed on said longitudinally extending wall surface of said passageway extending in a direction substantially parallel to the axis thereof; said wall surfaces further comprising spaced material receiving portions adjacent said rib means into which portions of the plastic material forming said rib means may be depressed by the application of pressure to said rib means.

3. The bushing as defined in claim 1 wherein said first peripherally spaced portions on said spherical outer peripheral surface extend longitudinally and substantially in an axial direction relative to the axis of said bushing.

4. The bushing as defined in claim 1 wherein said first peripherally spaced portions on said spherical outer surface extend circumferentially around and transverse to the axis of said bushing.

5. The bushing as defined in claim 1 wherein said first peripherally spaced portions on said spherical outer surface comprise a pair of axially offset, semicircular, substantially crescent-shaped rings, extending from opposite sides of said bushing and being integrally joined in overlapping relationship to one another at points on said outer surface intermediate said opposite sides.

6. The bushing as defined in claim 1 wherein said first peripherally spaced portions on said spherical outer surface comprise a plurality of substantially axially extending ribs.

7. The bushing as defined in claim 1 wherein said bushing is longitudinally split throughout its extent.

8. The bushing as defined in claim 7 wherein said retaining means comprise a shoulder portion projecting inwardly between said different diameter wall surfaces, said shoulder being adapted to be engaged with a complementary groove provided in a shank element.